(12) United States Patent
Fukui et al.

(10) Patent No.: US 8,947,674 B2
(45) Date of Patent: Feb. 3, 2015

(54) SURFACE PROFILE MEASURING APPARATUS AND METHOD

(71) Applicant: Panasonic Corporation, Osaka (JP)

(72) Inventors: Atsushi Fukui, Osaka (JP); Hirotoshi Oikaze, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 101 days.

(21) Appl. No.: 13/794,884

(22) Filed: Mar. 12, 2013

(65) Prior Publication Data

US 2013/0278938 A1   Oct. 24, 2013

(30) Foreign Application Priority Data

Apr. 23, 2012  (JP) ................................. 2012-098000

(51) Int. Cl.
  *G01B 11/02* (2006.01)
  *G01B 11/24* (2006.01)
  *G01B 9/02* (2006.01)

(52) U.S. Cl.
  CPC ........ *G01B 11/2441* (2013.01); *G01B 9/02015* (2013.01)

USPC ............................................ 356/511; 356/496

(58) Field of Classification Search
  USPC ......... 356/511–515, 521, 496, 517, 484–486, 356/503–504
  See application file for complete search history.

(56) References Cited

U.S. PATENT DOCUMENTS

4,832,489 A    5/1989  Wyant et al.

*Primary Examiner* — Tri T Ton
(74) *Attorney, Agent, or Firm* — Panasonic Patent Center (57) ABSTRACT

A surface profile measuring apparatus includes a reflection unit to reflect a reference beam diffracted by a first diffraction grating and cause the reflected reference beam to be incident on the first diffraction grating again, a detection unit to receive an interference beam in which the reference beam diffracted again by the first diffraction grating and a measuring beam reflected by a sample surface optically interfere with each other, and detect an interference intensity signal for each, wavelength in the interference beans, a shifting unit to shift the first diffraction grating in a direction perpendicular to a grating groove direction of the first diffraction grating, a calculation unit to calculates a phase on a basis of the interference intensity signal for each wavelength varying with a degree of shift, and a measurement unit to measure the sample surface.

10 Claims, 11 Drawing Sheets

DIFFRACTION GRATING PITCH p
INCIDENT BEAM WAVELENGTH $\lambda$
INCIDENCE ANGLE $\theta$
DIFFRACTION BEAM
DIFFRACTION ANGLE $\phi$ DIFFRACTION EQUATION
$\sin\theta + \sin\phi = n\lambda/p$
n IS DIFFRACTION ORDER

FIG.3

EQUIVALENT PHASE SURFACE

EQUIVALENT PHASE SURFACE WHEN GRATING IS SHIFTED BY w

SURFACE PROFILE MEASURING APPARATUS AND METHOD

CROSS REFERENCE TO RELATED APPLICATIONS

This application is entitled and claims the benefit of Japanese Patent Application No. 2012-098000, filed on Apr. 23, 2012, the disclosure of which including the specification, drawings and abstract is incorporated herein by reference in its entirety.

BACKGROUND

1. Technical Field

The present technical field relates to a surface profile measuring apparatus and a surface profile measuring method using a phase-shifting method.

2. Background Art

Figure 12:
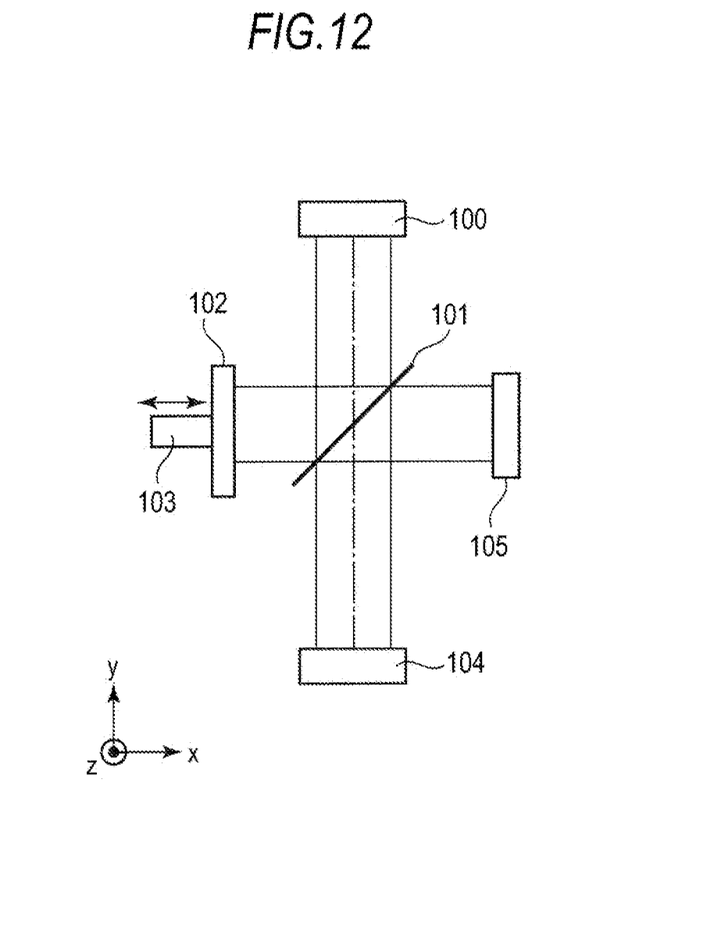
FIG. 12 is a diagram illustrating the configuration of a phase-shifting interferometer according to the related art.

A schematic diagram illustrating surface profile measurements using a phase-shifting method according to the related art is shown in FIG. 12.

A beam from a light source 100 shown in FIG. 12 is split by a half mirror 101 and the split beams are applied to a sample surface 104 and a reference surface 102, respectively. Return beams from the sample surface 104 and the reference surface 102 are superimposed through the half mirror 101. When the two return beams are superimposed, optical interference occurs. An interference intensity signal of the optical interference is detected by the use of a CCD 105. The interference intensity signal varies in a sinusoidal shape depending on the difference in optical path length between the reference surface 102 side and the sample surface 104 side. The difference in optical path length corresponding to one wavelength constitutes a sine wave of a cycle. In the phase-shifting method, the height of the sample surface 104 is measured by detecting the initial phase of the sine wave.

The initial phase of a sine wave is detected as follows. The reference surface 102 is shifted in x axis direction by a piezoelectric stage 103. The optical path length is changed with this shift and the resultant variation in the interference intensity signal is detected. The initial phase is detected from this variation. Specifically, the reference surface 102 is shifted in four steps by every ⅛ wavelength of the beam from the light source 100. When the interference intensity signals detected at this time are defined as $I_1$, $I_2$, $I_3$, and $I_4$, the initial phase $\phi$ is calculated as $\tan \phi = (I_1 - I_3)/(I_2 - I_4)$.

The difference in optical path length s between the return beams from the sample surface 104 and the reference surface 102 is calculated as $s = \phi/2\pi \times \lambda$ from the initial phase $\phi$. Here, since the phase is repeated in the range of 0 to $2\pi$ (rad), the measureable height is a ½ wavelength and can be measured only in a very narrow range in the height direction. In order to broaden the measurement range, for example, a multi-wavelength phase-shifting method of converting the wavelength into plural wavelengths and carrying out a phase-shifting method at each wavelength is known (see U.S. Pat. No. 4,832,489).

However, in the related art, it is necessary to change the scanning dose to the reference surface 102 depending on the wavelength. Accordingly, it is necessary to repeat the scanning operations with different scanning doses depending on the wavelengths. Therefore, there is a problem in that the measurement time increases when many types of wavelengths are employed to obtain a broad measurement range in the height direction.

SUMMARY

Therefore, an object is to solve the above-mentioned problem through the use of the below embodiments, that is, to provide a surface profile measuring apparatus and a surface profile measuring method which can perform measurement at a high speed even when many types of wavelengths are used to obtain a broad measurement range in the height direction.

According to an aspect of an embodiment, there is provided a surface profile measuring apparatus including: a light source that emits a beam having a plurality of wavelengths; a splitter unit that splits the beam into a reference beam and a measuring beam; a first diffraction grating that diffracts the reference beam; a reflection unit that reflects the reference beam diffracted by the first diffraction grating and causes the reflected reference beans to be incident on the first diffraction grating again; a detection unit that receives an interference beam in which the reference beans incident again on the first diffraction grating and diffracted again by the first diffraction grating and the measuring beam reflected by a sample surface optically interfere with each other and that defects an interference intensity signal for each wavelength in the interference beam; a shifting unit that shifts the first diffraction grating in a direction perpendicular to a grating groove direction of the first diffraction grating; a calculation unit that calculates a phase of the interference intensity signal for each wavelength in the interference beam on the basis of the interference intensity signal for each wavelength varying with a degree of shift of the first diffraction grating; and a measurement unit that measures the sample surface on the basis of the phase of the interference intensity signal for each wavelength.

As described above, according to the aspects of the embodiment, it is possible to carry out measurements at a high speed even when many types of wavelengths are used to obtain a broad measurement range in the height direction.

DETAILED DESCRIPTION OF THE EMBODIMENTS

Hereinafter, embodiments will be described. However, the below embodiments are merely examples.

First Embodiment

Figure 1A:
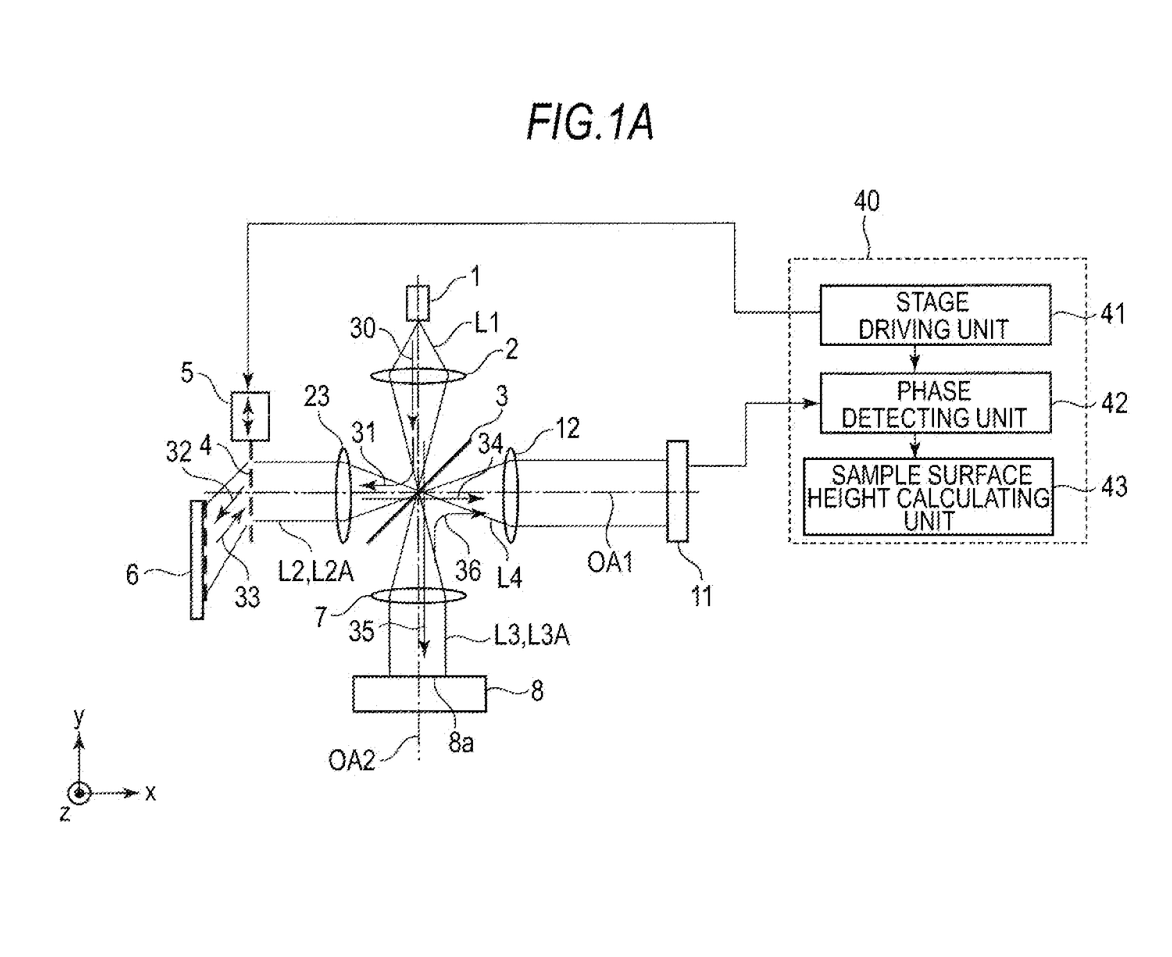
FIG. 1A is a diagram schematically illustrating a surface profile measuring apparatus according to a first embodiment.

FIG. 1A is a diagram schematically illustrating a surface profile measuring apparatus according to a first embodiment.

The surface profile measuring apparatus according to the first embodiment includes a light source 1, a beam splitter 3, a first diffraction grating 4, a second diffraction grating 6, and a CCD 11.

The light source 1 emits a beam L1 having plural wavelengths.

The beam splitter 3 serves as an example of the splitter unit and splits the beam L1 which has been emitted into a reference beam L2 and a measuring beam L3.

The first diffraction grating 4 diffracts the reference beam L2 incident thereon.

The second diffraction grating 6 serves as an example of the reflection unit, and serves to reflect the reference beam L2 diffracted by the first diffraction grating 4 and to cause the reflected reference beam to be incident on the first diffraction grating 4 again. A reference beam L2A which has been incident on the first diffraction grating 4 again and diffracted again by the first diffraction grating 4 and a measuring beam L3A which has been incident on a sample 8 and reflected by the sample optically interfere with each other through the use of the beam splitter 3 to form an interference beam L4.

The CCD 11 serves as an example of the detection unit and detects an interference intensity signal for each wavelength in the interference beam L4.

The surface profile measuring apparatus according to the first embodiment includes a piezoelectric stage 5, a phase detecting unit 42, and a sample surface height calculating unit 43.

The piezoelectric stage 5 serves as an example of the shifting unit and shifts the first diffraction grating 4 in a direction perpendicular to the direction of the grating grooves thereof. With the shift of the first diffraction grating 4 by the piezoelectric stage 5, the interference intensity signal for each wavelength in the interference beam L4 varies. A stage driving unit 41 drives the piezoelectric stage 5.

The phase detecting unit 42 serves as an example of the calculation unit and calculates the phase of the interference intensity signal tor each wavelength in the interference beam L4. More specifically, the phase detection unit 42 acquires the interference intensity signal from the CCD 11 in synchronization with the stage driving unit 41 and calculates the phase from the acquired interference intensity signal for each wavelength.

The sample surface height calculating unit 43 serves as an example of the measurement unit and measures the height of a sample surface 8a of the sample 8 on the basis of the phase of the interference intensity signal for each wavelength calculated by the phase detecting unit 42.

In FIG. 1A, the light source 1 is a white light source emitting light of a broad band, such as a halogen lamp, a xenon lamp, a white LED, or an extremely short pulse laser. A light flux 30 from the light source 1 is emitted as the emitted beam L1.

In order to improve the interference intensity, it is preferable that the beam splitter 3 have a light intensity ratio of a light flux 31 to a light flux 35 of approximately 1:1. In this case, a half mirror having a splitting ratio of 1:1 is employed as the beam splitter 3.

The first diffraction grating 4 is a transmissive diffraction grating, is a blazed diffraction grating having grating grooves of a linear shape in the z axis direction in FIG. 1A, and diffracts a beam in only one direction in the xy plane. The first diffraction grating 4 is disposed so that one light flux 31 into which the emitted beam is split by the beam splitter 3 is incident thereon and the surface on which the grating grooves are formed is substantially perpendicular to an optical axis OA1 of the light flux 31. For example, a single-layered reflecting film of $MgF_2$ or the like, a multi-layered antireflection film, or an antireflection film having a microstructure smaller than a wavelength is formed on the surface of the first diffraction grating 4. The x axis, the y axis, and the z axis are perpendicular to each other. The xy plane represents a plane defined by the x axis and the y axis, the yz plane represents a plane defined by the y axis and the z axis, and the zx plane represents a plane defined by the z axis and the x axis. The xy plane, the yz plane, and the zx plane are perpendicular to each other.

The second diffraction grating 6 is a reflective diffraction grating and is a blazed diffraction grating having grating grooves of a linear shape parallel to the z axis direction in FIG. 1A. The second diffraction grating 6 diffracts a beam in only one direction in the xy plane. A light flux 32 from the first diffraction grating 4 is diffracted by the second diffraction grating 6 and becomes a light flux 33. The optical path of the light flux 33 is the same as the light flux 32 and the traveling direction thereof is opposite thereto.

In the first diffraction grating 4 and the second diffraction grating 6, the grating groove directions thereof are parallel to each other and the surfaces having the grating grooves formed thereon are parallel to each other. When the grating groove pitch of the first diffraction grating 4 is p, the grating groove pitch of the second diffraction grating 6 is p/2. In every wavelength included in the light flux 31, the optical paths of the light flux 32 and the light flux 33 are equal to each other and the traveling directions thereof are opposite to each other, due to the first diffraction grating 4 and the second diffraction grating 6. The relationship between the grating groove pitches of the first diffraction grating 4 and the second diffraction grating 6 will be described later.

The sample surface 8a is disposed to be almost perpendicular to the optical axis OA2 of the light flux 35 changed to a parallel beam by a lens 7. The sample 8 is, for example, a semiconductor device having patterns formed thereon, a solar cell, an LED, or an MEMS.

Figure 1B:
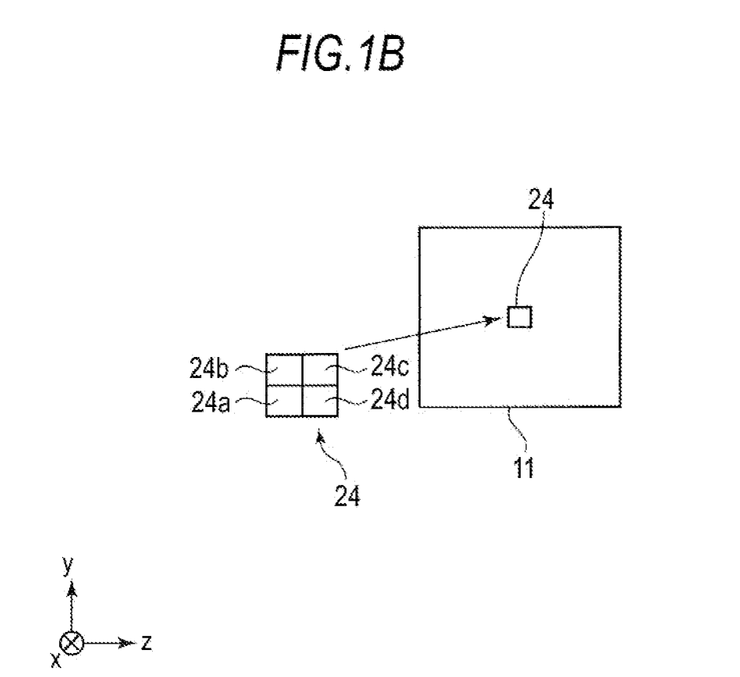
FIG. 1B is an enlarged view schematically illustrating a CCD unit of the surface profile measuring apparatus according to the first embodiment.

The CCD 11 is an imaging camera in which elements are two-dimensionally arranged. The sample surface 8a and the CCD 11 have an imaging relationship due to the lens 7 and a lens 12. The CCD 11 includes plural units capable of detecting light intensity for each wavelength. Each unit 24 out of the plural units of the CCD 11 includes plural wavelength filters 24a, 24b, 24c, and 24d for each pixel, for example, as shown in FIG. 1B. A single place of the sample surface 8a is detected by a single unit 24 of the CCD. In order to simultaneously detect plural wavelengths, it is necessary to use a wavelength filter for each wavelength used for a measurement. Two or more filters are disposed for each unit 24. The CCD 11 may be a CMOS.

The focal plane of the lens 12 in FIG. 1A is located at a position overlapping with the focal planes of a lens 2, a lens 23, and the lens 7 with the beam splitter 3 interposed therebetween.

A control and computing unit 40 is a unit that collectively controls and computes the surface profile measuring apparatus. The control and computing unit 40 includes the stage driving unit 41, the phase detecting unit 42, and the sample surface height calculating unit 43.

The operation of the surface profile measuring apparatus having the above-mentioned configuration will be described below.

A light flux 30 emitted as the beam L1 from the light source 1 is focused by the lens 2 and enters the beam splitter 3. The beam splitter 3 splits the light flux 30 of the emitted beam L1 into the light flux 31 of the reference beam L2 and the light flux 35 of the measuring beam L3.

The light flux 35 of the measuring beam L3 is changed to a parallel beam by the lens 7 and is applied to the sample surface 8a. A light flux 36 which is the measuring beam L3A reflected by the sample surface 8a is focused by the lens 7, is reflected by the beam splitter 3, and enters the CCD 11 via the lens 12.

The light flux 31 of the reference beam L2 is changed to a parallel beam by the lens 23 and enters the first diffraction grating 4. Since the first diffraction grating 4 is a blazed diffraction grating, the first diffraction grating 4 diffracts the light flux 31 in almost one direction. The light flux 31 diffracted by the first diffraction grating 4 is incident as the light flux 32 on the second diffraction grating 6. The light flux 32 incident on the second diffraction grating 6 is reflected and diffracted by the second diffraction grating 6 and is incident as the light flux 33 on the first diffraction grating 4 again. Thereafter, the light flux 33 is diffracted by the first diffraction grating 4 again, is incident on the lens 23, and is then focused as a light flux 34 by the lens 23.

Since the focal planes of the lens 23 and the lens 12 are matched with each other on the beam splitter 3, the light flux 34 passes through the beam splitter 3 and is changed to a parallel beam by the lens 12. Since the focal planes of the lens 23 and the lens 7 are matched with each other, the light flux 36 of the measuring beam L3A and the light flux 34 of the reference beam L2A optically interfere with each other on the beam splitter 3 to form the interference beam L4. The CCD 11 receives the interference beam L4 of the light flux 34 and the light flux 36. Plural wavelength filters transmitting a specific wavelength are disposed in each unit 24 (see FIG. 1B) of the CCD 11. Accordingly, for each place of the sample surface 8a, the interference intensity signal for each wavelength in the interference beam L4 is acquired by the CCD 11. Since the sample surface 8a and the CCD 11 have the imaging location due to the lens and the lens 12, the sample surface 8a is projected onto the CCD 11. Accordingly, the CCD 11 detects the interference intensity signal for each wavelength of the interference beam L4 for each position of the sample surface 8a by the use of a single unit 24.

The structure and arrangement of each of the first diffraction grating 4 and the second diffraction grating 6 will be described below.

Figure 2:
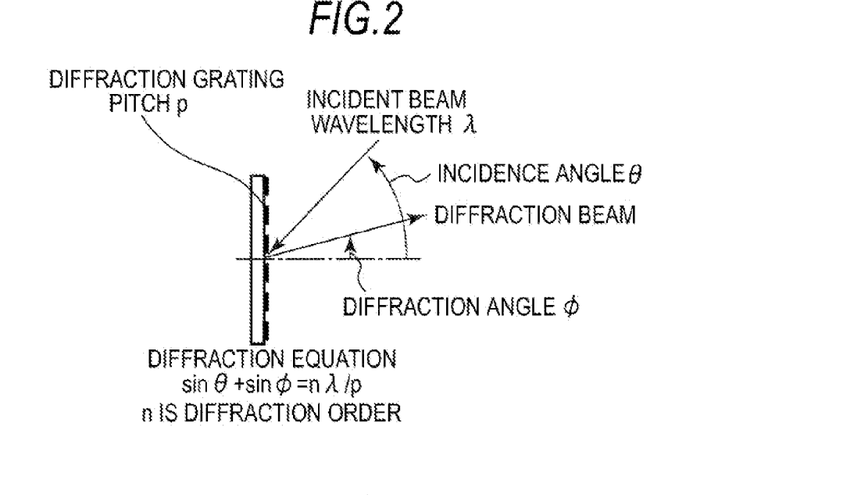
FIG. 2 is a diagram illustrating a diffraction angle in the first embodiment.

As shown in FIG. 2, when the incidence angle on a diffraction grating is defined as $\theta$, the diffraction angle is defined as $\phi$, the incident beam wavelength is defined as $\lambda$ and the diffraction grating pitch is defined as p, a diffraction equation is expressed by Expression 1.

$$\sin\theta + \sin\phi = n \times \lambda/p \quad \text{(Expression 1)}$$

In the first embodiment, since the applied diffraction order n is 1, Expression 2 is obtained by substituting n=1 for Expression 1.

$$\sin\theta + \sin\phi = \lambda/p \quad \text{(Expression 2)}$$

Here, since the grating pitch of the first diffraction grating 4 in FIG. 1A is p and the incidence angle $\theta$ is 0 (rad), that is, the beam is incident perpendicularly, the diffraction angle $\phi_1$ in the second diffraction grating 6 is expressed by Expression 3.

$$\sin\phi_1 = \lambda/p \quad \text{(Expression 3)}$$

The grating pitch of the second diffraction grating 6 is a half of the pitch p of the first diffraction grating 4, that is, p/2. Since the incidence angle $\theta_2$ on the second diffraction grating 6 is $\phi_1$, the diffraction angle $\phi_2$ in the second diffraction grating 6 is expressed by Expression 4.

$$\sin\phi_1 + \sin\phi_2 = \lambda/(p/2) \quad \text{(Expression 4)}$$

Expression 5 is obtained by substituting Expression 3 for Expression 4.

$$\sin\phi_2 = \lambda/p \quad \text{(Expression 5)}$$

Since $\phi_1 = \phi_2$ is established by Expressions 3 and 5, the diffraction angle for each wavelength differs in the first diffraction grating 4 and the second diffraction grating 6 in FIG. 1A, but the reflected and diffracted beam (light flux 33) of the second diffraction grating 6 has the same direction as the incident beam (light flux 32) on the second diffraction grating 6 and is returned along the same optical path for each wavelength. Therefore, the reflected beam (light flux 34) from the reference surface side including the first diffraction grating 4 and the second diffraction grating 6 can be returned as a parallel beam to the beam splitter 3 in FIG. 1A along the same optical path as the incident beam (light flux 31).

The operation of the piezoelectric stage 5 contributing to an increase in the height measuring speed of the sample surface 8a will be described below.

Figure 3:
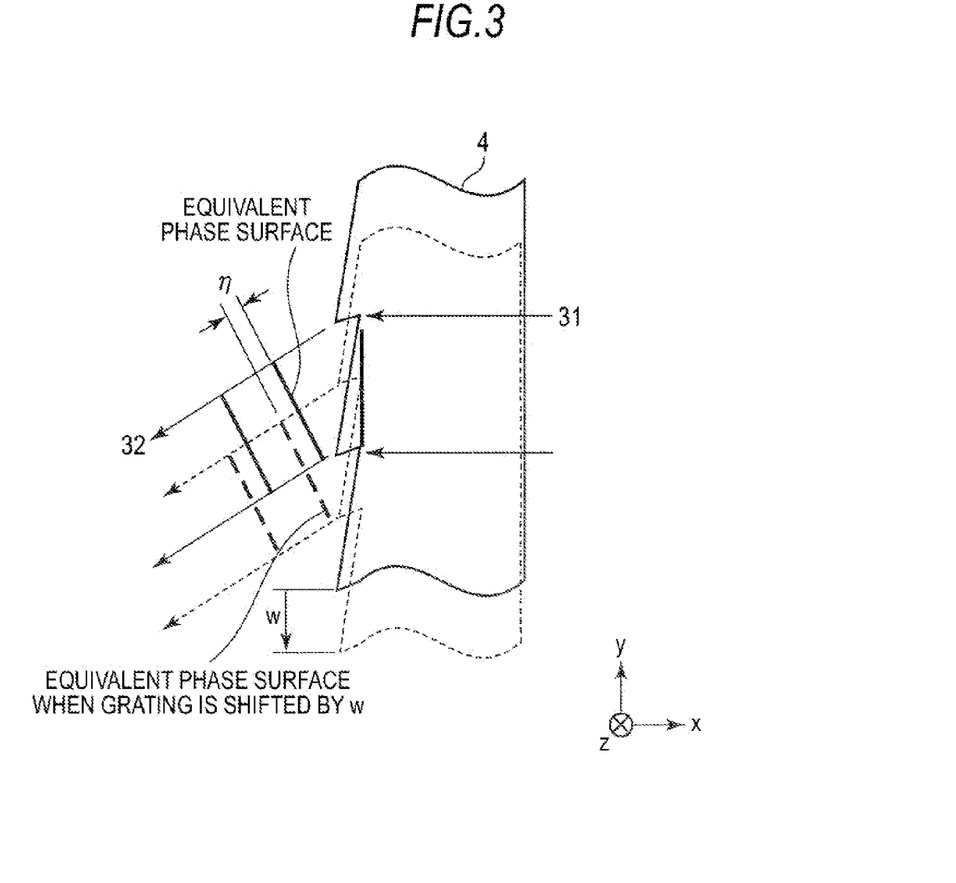
FIG. 3 is a diagram illustrating phase modulation in a diffraction grating in the first embodiment.

The first diffraction grating 4 is slightly shifted in the direction (the y axis direction) perpendicular to the grating groove direction by the piezoelectric stage 5. As shown in FIG. 3, the phase of the light flux 32 exiting from the first diffraction grating 4 varies by $\eta$ with the degree of shift w of the first diffraction grating 4. This $\eta$ is defined as a degree of phase modulation. When the degree of shift w of the first diffraction grating 4 is set to one pitch, that is, p, the phase of the light flux 32 varies by $2\pi$ (rad). Therefore, the degree of shift w and the degree of phase modulation $\eta$ of the first diffraction grating 4 are expressed as $\eta = 2\pi w/p$. In this way, the degree of phase modulation $\eta$ does not depend on the wavelength. In the 4-step phase-shifting method, four phase modulations of every $\pi/4$ (rad) is given to the reference surface side, and the height is measured from four intensity values acquired at that time. For example, it is assumed that the first diffraction grating 4 is shifted in four steps every p/8 pitches. When the degree of shift of the piezoelectric stage 5 is set to w=p/8, 2×p/8, 3×p/8, and 4×p/8, the degree of phase modulation becomes $\eta = 2\pi/8, 2\pi \times 2/8, 2\pi \times 3/8$, and $2\pi \times 4/8$ (rad). Here, since the light flux 32 exiting from the first diffraction grating 4 in FIG. 1A is reflected by the second diffraction grating 6, is returned as the light flux 33 along the same optical path, and is phase-modulated again by the first diffraction grating 4, the degree of phase modulation of the light flux 34 is $2\eta$. Since the degree of phase modulation $\eta$ does not depend on the wavelength, it is possible to accurately perform, the phase modulation that is proportional to the degree of shift w of the first diffraction grating 4 for each wavelength.

Here, effects of the phase modulation using the piezoelectric stage 5 and the first diffraction grating 4 will be described below.

For example, it is intended to perform the phase modulation on a beam L1 of a broad band such as white light by changing the optical path length as in the related art. Then, since the change in optical path length differs depending on wavelengths, it is necessary to individually perform the phase modulation for each wavelength. Accordingly, the phase modulation takes a lot of time in the related art. When the optical path length is changed to perform the phase modulation, it is necessary to control the change in optical path length to about one wavelength and it is thus difficult to perform accurate adjustment. Accordingly, when different optical path lengths are given for the wavelengths and the phase modulation is individually performed, much time is required and the degree of phase modulation may differ depending on the wavelengths.

On the other hand, as in the first embodiment, by shifting the first diffraction grating 4 in the direction perpendicular to the grating groove direction, it is possible to simultaneously perform the same degree of phase modulation on a beam L1 of a broad band such as white light for all the wavelengths. By simultaneously performing the phase modulation, it is possible to reduce the difference in the degree of phase modulation between the wavelengths. The degree of shift of the first diffraction grating 4 can be set to about a pitch of the first diffraction grating 4, for example, several tens of wavelengths or more. In general, the piezoelectric stage 5 has hysteresis and thus a shift error may occur. On the contrary, in the first embodiment, the degree of shift can be set to be larger than the degree of shift of the reference surface by about one wavelength in the phase-shifting method according to the related art. As a result, it is possible to relatively reduce the shift error of the piezoelectric stage 5. Accordingly, it is possible to reduce the difference in the degree of phase modulation between the wavelengths in the first embodiment, compared with the related art.

The operation of the sample surface height calculating unit 43 of detecting the height of the sample surface 8a from the interference signal intensities of the interference intensity signals acquired from the CCD 11 will be described below.

The piezoelectric stage 5 is driven and the interference intensity signals from the CCD 11 are acquired at that time by the phase detecting unit 42 in synchronization with the driving of the piezoelectric stage 5. The phase detecting unit 42 detects a phase on the basis of the interference intensity signals acquired by the phase detecting unit 42.

When detecting a phase, the degree of shift w of the first diffraction grating 4 is set to four steps of w=p/8, 2×p/8, 3×p/8, and 4×p/8. At this time, the interference intensity signals at a wavelength λ for each degree of shift w are defined as $I_1$, $I_2$, $I_3$, and $I_4$. Then, the phase $\phi_\lambda$ of the interference intensity signal at a wavelength λ is obtained from Expression 6.

$$\phi_\lambda = a\tan(I1-I3)/(I2-I4) \quad \text{(Expression 6)}$$

Figure 4:
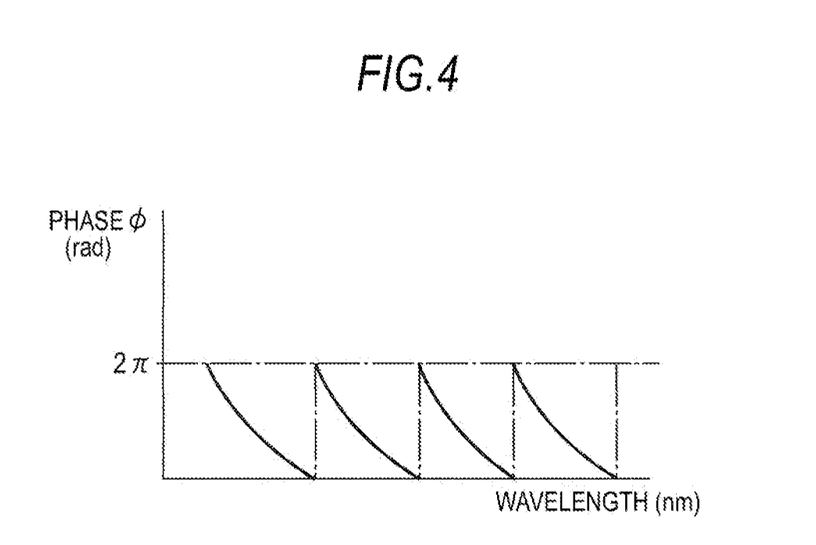
FIG. 4 is a diagram illustrating a graph of a phase detected in the first embodiment.
Figure 5:
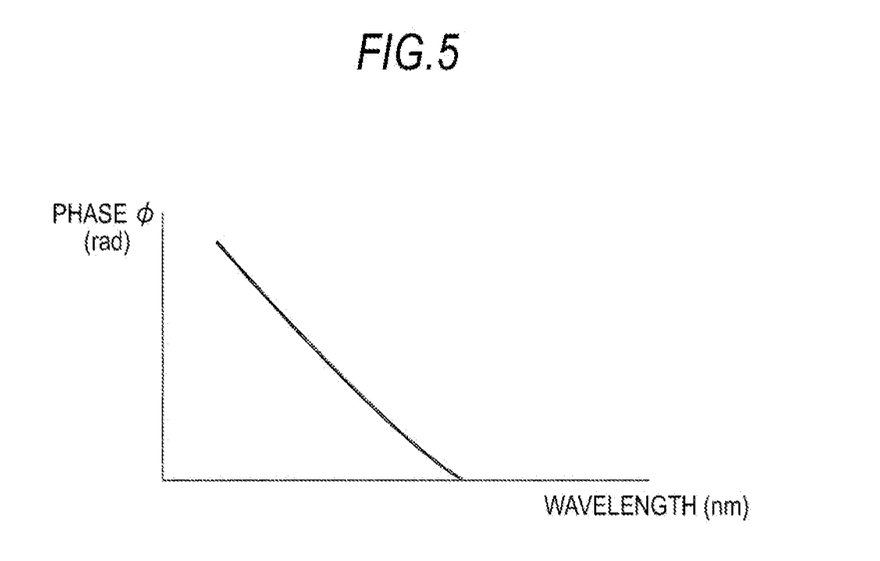
FIG. 5 is a diagram illustrating a graph after phase coupling in the first embodiment.

This is calculated for each wavelength to obtain the relationship between the wavelength λ and the phase φ. Here, since the phase φ is repeated with a cycle of 0 to 2π (rad), the phase data of the obtained phase φ can be expressed as a graph which is repeated with a cycle of 0 to 2π (rad), where the horizontal axis represents the wavelength (nm) and the vertical axis represents the phase φ (rad), as shown in FIG. 4, In FIG. 4, the phase is repeated with a cycle of 0 to 2π (rad) and can be easily connected. When the phases in the phase data shown in FIG. 4 are connected, the graph shown in FIG. 5 is obtained. Regarding the connection of the phases, for example, the phase detecting unit 42 shown in FIG. 1A performs an operation of adding −2π rad when there is a phase difference of π rad or more between adjacent data pieces and adding +2π rad when there is a phase difference of −π rad or less therebetween from the right side to the left side in the graph shown in FIG. 4. FIG. 5 is a graph obtained by connecting the phases shown in FIG. 4, where the horizontal axis represents the wavelength (nm) and the vertical axis represents the phase φ (rad).

The sample surface height calculating unit 43 calculates the height of the sample surface 8a from the phases obtained by the phase detecting unit 42 shown in FIG. 1A.

The interference intensity signal varies depending on the difference between the optical path length of the beam exited from the beam splitter 3, reflected by the second diffraction grating 6, and returned to the beam splitter 3 and the optical path length of the beam exited from the beam splitter 3, reflected by the sample surface 8a, and returned to the beam splitter 3. The phase of the interference intensity signal varies by 2π rad with the difference in the optical path length corresponding to one wavelength. When the interference signal phase at a wavelength λ is defined as $\phi_\lambda$, the optical path difference h is expressed by Expression 7.

$$h = \phi_\lambda \times \lambda/2\pi \quad \text{(Expression 7)}$$

Figure 6:
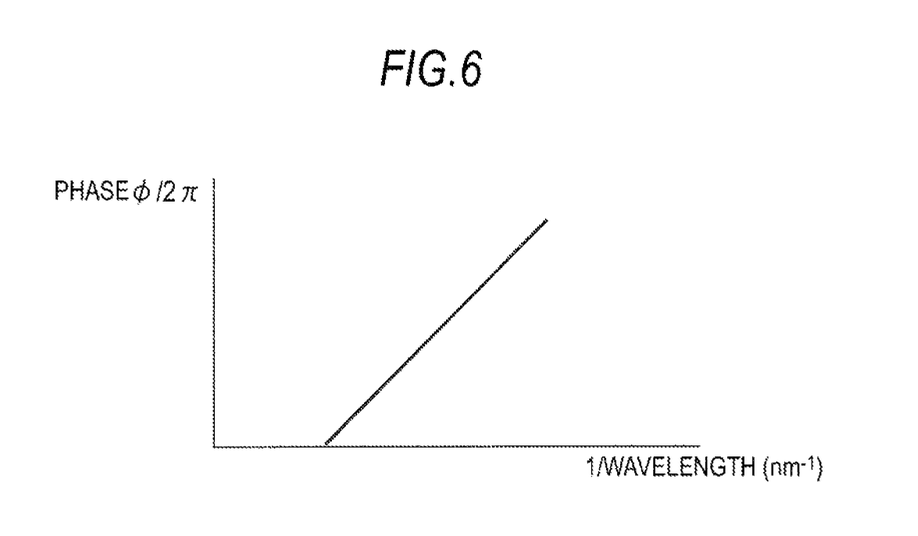
FIG. 6 is a diagram illustrating a graph in which the reciprocal of a wavelength is represented in the horizontal axis in the first embodiment.

Since $\phi_\lambda/2\pi = h/\lambda$ is established in Expression 7, the graph shown in FIG. 5 is deformed by causing the horizontal axis to represent the reciprocal of the wavelength λ and causing the vertical axis to represent the phase φ/2π. Then, as shown in FIG. 6, a linear graph is obtained. Since the coefficient (slope coefficient) indicating the slope of the graph shown in FIG. 6 is the optical path length difference h, the sample surface height calculating unit 43 shown in FIG. 1A calculates the slope coefficient from the data shown in FIG. 6, for example, using a least square method. Since it is a reflection optical path, the height of the sample surface 8a can be calculated as ½ of the optical path length difference h by the sample surface height calculating unit 43.

Here, the measurement time of the surface profile measuring apparatus according to the first embodiment will be described below in comparison with that in the related art.

In order to perform stable scanning by the use of the piezoelectric stage 103 shown in FIG. 12, an operation except for a nonlinear shift in a scanning start part and also a return operation of the piezoelectric stage 103 is necessary. For example, the time until the scanning operation is stabilized after it is started is 100 msec and the time required for the shift of one step and the acquisition of an image is 30 msec. The return time of the piezoelectric stage 103 is 30 msec and the wavelength is switched in four steps. In this case, except for the final return time of the piezoelectric stage, (100+30×4)×4+ 30×3=970 msec is required for one measurement.

On the other hand, in the measurement using the surface profile measuring apparatus according to the first embodiment, since it is not necessary to switch the wavelength, the measurement time is (100+30×4)=220 msec. In this way, by employing the surface profile measuring apparatus according to the first embodiment, it is possible to greatly reduce the measurement time.

As described above, by employing the surface profile measuring apparatus according to the first embodiment, it is possible to measure a surface profile at a high speed even when multiple wavelengths are used to obtain a broad measurement range in the height direction.

In the first embodiment, the reflective second diffraction grating 6 is used to return a beam diffracted by the first diffraction grating 4 shown in FIG. 1A to the original optical path. On the other hand, a lens 20 disposed just after the first diffraction grating 4 and a mirror 21 disposed on the focal plane of the lens 20 may be used instead of the second diffraction grating 6, as shown in FIG. 7.

Figure 7:
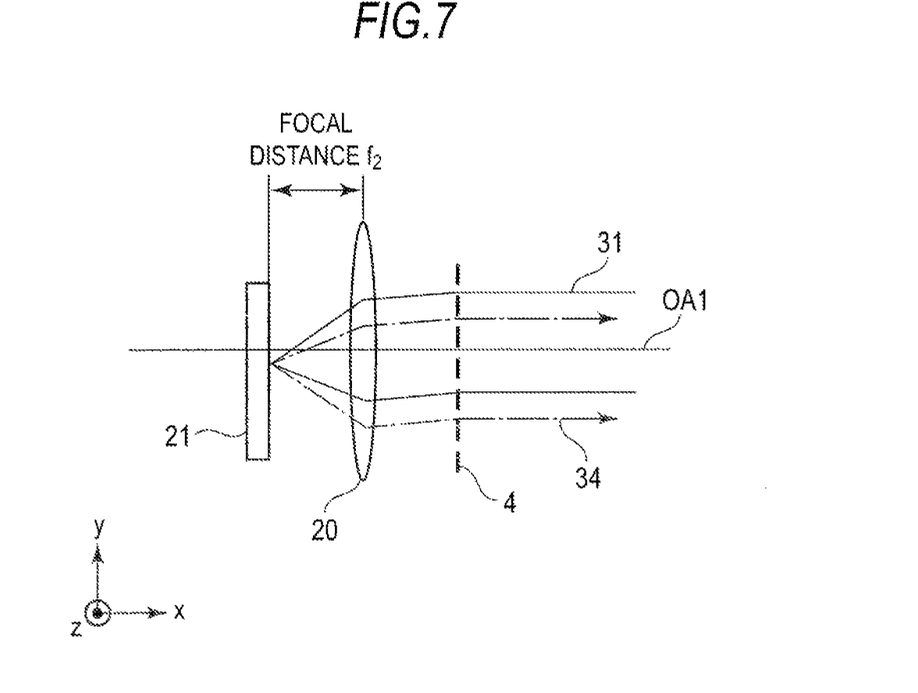
FIG. 7 is a diagram illustrating a modification example of a reflection unit in the first embodiment.

By employing the configuration shown in FIG. 7, the light flux 31 diffracted by the first diffraction grating 4 is focused on the focal plane of the lens 20. Since the surface of the mirror 21 is disposed on the focal plane, the light flux 31 is reflected by the surface of the mirror 21 and is incident as the light flux 34 on the lens 20 again. At this time, since the reflection point is located on the focal plane of the lens 20, the light flux 31 incident on the lens 20 and the light flux 34 exiting from the lens 20 travel the same optical path. Accordingly, both the light flux 31 incident on the first diffraction grating 4 and the light flux 34 exiting from the first diffraction grating 4 travel the same optical path along the optical axis OA1.

In this way, by employing the lens 20 and the mirror 21 shown in FIG. 7, stray light resulting from a high-order diffraction beam is not generated. Here, when the second diffraction grating 6 shown in FIG. 1A is used, the accuracy with which the light flux 34 is returned to the original optical path (the optical path through which the light flux 31 passes) is higher than that of when the lens 20 and the mirror 21 are used.

Second Embodiment

A surface profile measuring apparatus according to a second embodiment will be described below with reference to FIG. 8.

The second embodiment is different from the first embodiment, in that a cylindrical lens 22 and a lens 7a are disposed between the beam splitter 3 and the sample surface 8a, a CCD 11a is employed, and a third diffraction grating 9 and a cylindrical lens 10a are disposed between the lens 12 and the CCD 11a. Accordingly, in FIG. 8, the measurement of the sample surface 8a is limited to a linear shape to improve the resolution of measurement in the linear direction.

The constituents will foe described below.

The cylindrical lens 22 serves as an example of the first cylindrical lens and the cylinder axis thereof is parallel to the x axis direction. In the xy plane, the cylindrical lens 22 does not have a lens function, and a light flux 35 passing through, the cylindrical lens 22 is focused on the sample surface 8a by the lens 7a. In the yz plane, the cylindrical lens 22 has a lens function. Accordingly, in the yz plane, the light flux 35 is applied as a parallel beam onto the sample surface 8a substantially perpendicularly by the cylindrical lens 22 and the lens 7a. By disposing the cylindrical lens 22 in this way, the light flux 35 forms a focus spot arranged in a linear shape parallel to the z axis direction on the sample surface 8a. In this case, a measuring beam L3A (light flux 36) from the sample surface 8a is focused on the beam splitter 3 through the use of the lens 7a and the cylindrical lens 22, and is then incident on the lens 12. The light flux 36 incident on the lens 12 exits as a parallel beam from the lens 12. At this time, the light flux 36 and the light flux 34 are superimposed into an interference beam L4 by the beam splitter 3. The interference beam L4 enters the third diffraction grating 9 via the lens 12.

The third diffraction grating 9 is a transmissive diffraction grating and is disposed in the optical path of the interference beam L4 between tine beam splitter 3 and the CCD 11a. The grating groove direction of the third diffraction grating 9 is parallel to the z axis direction. In the xy plane, the third diffraction grating 9 diffracts the interference beam L4 from the lens 12. In the zx plane, the third diffraction grating 9 does not have a diffraction function for the interference beam L4.

The cylindrical lens 10a, which serves as an example of the second cylindrical lens, has an f-θ function. The cylinder axis of the cylindrical lens 10a is parallel to the z axis direction. The cylindrical lens 10a focuses the interference beam L4 diffracted and dispersed by the third diffraction grating 9 and causes the interference beam to enter the CCD 11a. Since the cylindrical lens 10a does not have a lens function in the zx plane, the interference beam L4 exiting from the lens 12 is incident as a parallel beam on the CCD 11a. The focus spot of the interference beam L4 is formed to be arranged in a linear shape parallel to the z axis direction (the first direction) on the CCD 11a by the use of the cylindrical lens 10a. In this case, the CCD 11a receiving the interference beam L4 is disposed on the focal plane of the cylindrical lens 10a. The CCD 11a is generally a CCD of two-dimensional pixels. The CCD 11a may be a CMOS instead of the CCD.

Figure 9:
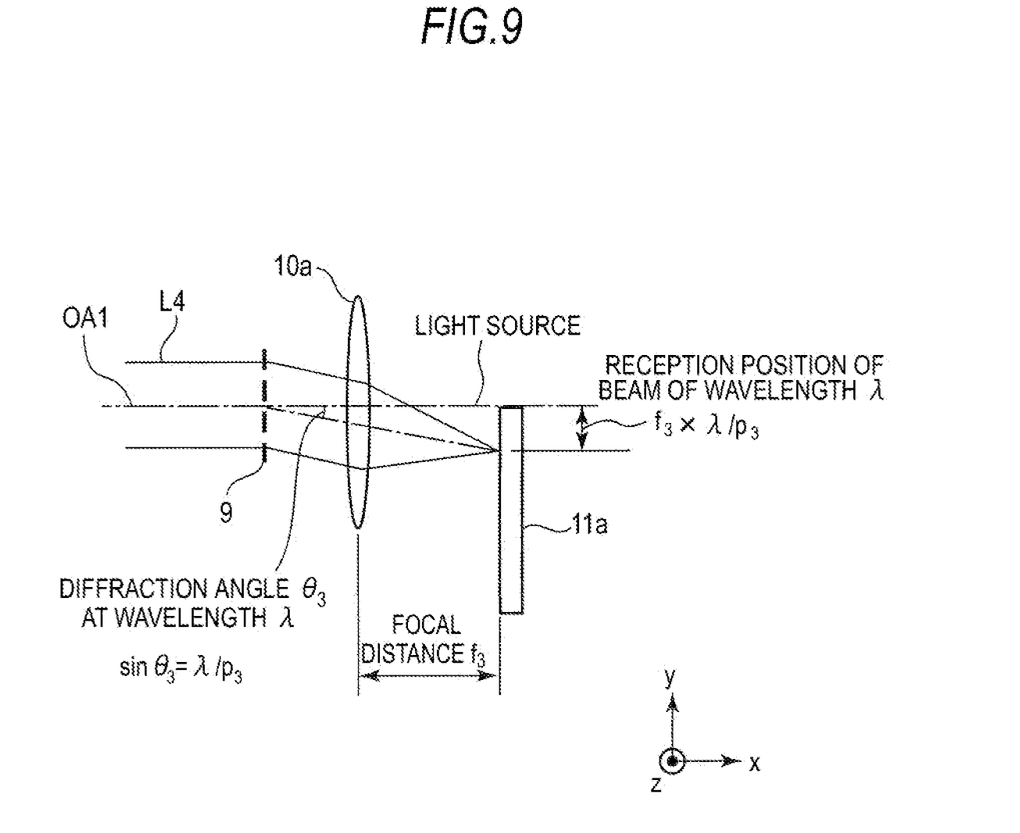
FIG. 9 is a diagram illustrating a detection unit in the second embodiment.

The focusing state of the interference beam L4 of a wavelength λ in the xy plane on the CCD 11a is shown in FIG. 9. The interference beam L4 diffracted by the third diffraction grating 9 is incident on the cylindrical lens 10a at different angles depending on the wavelengths. The interference beam L4 incident at different angles depending on the wavelengths is focused at different positions on the CCD 11a depending on the wavelengths by the use of the lens function of the cylindrical lens 10a. Accordingly, plural focus spots of a linear shape are formed on the CCD 11a. The intensities of the plural focus spots of a linear shape are detected by the CCD 11a. In this way, the interference intensity signals for the wavelengths of the interference beam L4 are detected by the CCD 11a. The positions of the spots of the interference beam L4 on the CCD 11a are positions of $f_3 \times \lambda / p_3$ from the optical axis OA1, where $f_3$ represents the focal distance of the cylindrical lens 10a and $p_3$ represents the grating pitch of the third diffraction grating 9.

When only the third diffraction grating 9 is disposed without using the cylindrical lens 10a, the interference beam L4 diffracted for every wavelength by the third diffraction grating 9 forms an image on the CCD 11a with the spots thereof superimposed. When the focus spots are superimposed on the CCD 11a, it is not possible to separate and detect the interference intensity signals for the wavelengths. Accordingly, by forming the focus spots arranged in a linear shape through the use of the cylindrical lens 10a, the focus spots for the wavelengths in the interference beam L4 are not superimposed on the CCD 11a.

Here, when the cylindrical lens 10a and the third diffraction grating 9 are arranged as described above, the focus spots arranged in a linear shape are formed on the CCD 11a. When the cylindrical lens 22 is not disposed, surface information of the sample surface 8a is treated as the information of a linear line. Accordingly, the resolution in the sample surface 8a decreases. In order to prevent this decrease, the cylindrical lens 22 in the second embodiment is disposed to form the focus spots arranged in a linear shape on the sample surface 8a and thus the decrease in resolution is prevented.

In the first embodiment (the configuration shown in FIGS. 1A and 1B), since the sample surface 8a can be measured as a surface shape, many areas of the sample surface 8a can be measured at the same time.

On the other hand, in the second embodiment (the configuration shown in FIG. 8), since the sample surface 8a is measured as a linear shape, it is possible to perform measurements with a higher resolution than that in the first embodiment. By employing the third diffraction grating 9 and the cylindrical lens 10a, it is possible to split the interference beam L4 with higher efficiency than that in the case where the filters are used as in the first embodiment. Accordingly, it is possible to improve light efficiency and to improve detection accuracy of the CCD 11*a* shown in FIG. 8, compared with the first embodiment.

In the first and second embodiments, when the reflecting surface of the beam splitter 3 faces the sample 8 side, a thickness correcting plate having the same thickness as the beam splitter 3 may be disposed between the beam splitter 3 and the sample 8 so as to correct the aberration due to the thickness of the beam splitter 3. Similarly, when the reflecting surface of the beam splitter 3 faces the first diffraction grating 4 side, a thickness correcting plate having the same thickness as the beam splitter 3 may be disposed between the beam splitter 3 and the first diffraction grating 4.

Figure 8:
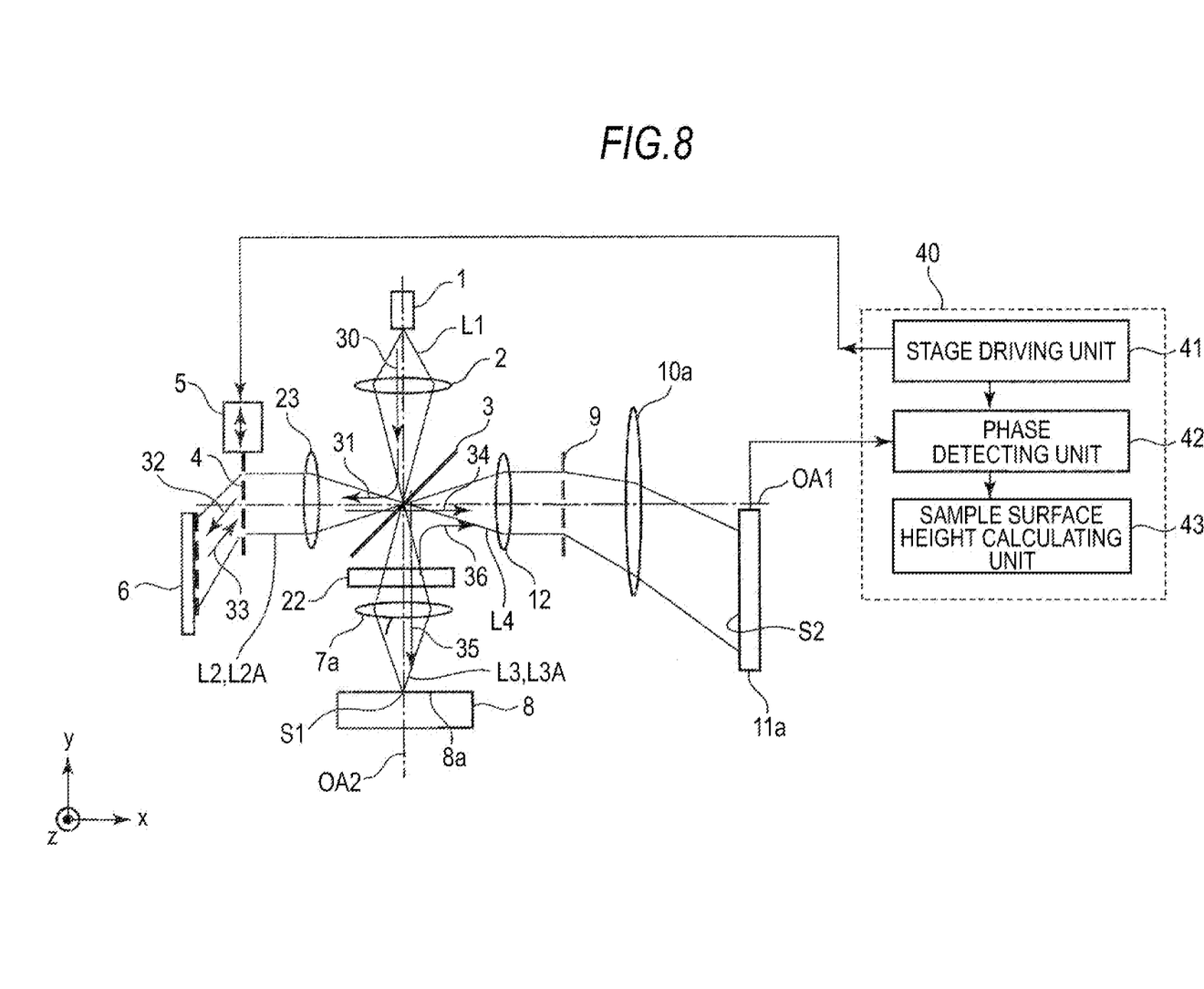
FIG. 8 is a diagram schematically illustrating a surface profile measuring apparatus according to a second embodiment.

In FIGS. 1A and 8, the reflection angle of the beam splitter 3 is shown as 90°. However, the reflection angle may be changed to the extent that the light fluxes such as the interference beam L4 and the optical elements such as the lens 12 do not interfere with each other.

In FIGS. 1A and 8, the first diffraction grating 4 is set to a transmissive type and the second diffraction grating 6 is set to a reflective type. Instead, the first diffraction grating of a reflective type and the second diffraction grating of a reflective type may be arranged in the optical path from the side closest to the beam splitter 3. In this case, the grating groove directions of the first and second diffraction gratings are disposed to be parallel to each other, and the grating groove pitch of the second diffraction grating is set to ½ of the grating groove pitch of the first diffraction grating. By setting the grating groove pitch of the second diffraction grating to ½ of the grating groove pitch of the first diffraction grating, a beam diffracted by the second diffraction grating can be made to enter the first diffraction grating again by the use of Expressions 4 and 5.

When the second diffraction grating 6 shown in FIGS. 1A and 8 is set to a transmissive type, the grating groove directions of the first and second diffraction gratings may be set to be parallel to each other, the grating groove pitches of the first diffraction grating and the second diffraction grating may be set to be equal to each other, a mirror perpendicularly reflecting a beam transmitted and diffracted by the second diffraction grating may be disposed. In this case, the beam diffracted by the second diffraction grating can be made to enter the first diffraction grating again.

Plural diffraction gratings may be disposed between the first diffraction grating 4 and the second diffraction grating 6 so as to diffract the beam plural times. Here, when the number of diffraction gratings is two, the optical loss due to the diffraction can be minimized.

By setting the cross-sectional shapes of the first diffraction grating 4 and the second diffraction grating 6 to a saw-edged (blazed) shape, a diffraction beam in only a necessary direction can be obtained and the optical loss and the stray light due to unnecessary diffraction beams are minimized. The cross-sectional shape of the diffraction grating may be a sinusoidal shape or a rectangular shape. However, when the cross-sectional shape of the diffraction grating is sinusoidal or rectangular, unnecessary diffraction beams are generated and it is thus necessary to provide an imaging unit (the CCD 11 or 11*a*) with a member blocking the unnecessary diffraction beams.

In consideration of the reflection from the beam splitter 3, when the first diffraction grating 4 or the second diffraction grating 6 is not parallel to the sample surface 8*a*, the measurement is made as if the sample surface 8*a* had an inclination. When the sample surface 8*a* has an inclination, it is necessary to take a broad scanning range in the height direction. Accordingly, it is preferable that the measurement be made after adjusting the inclinations of the sample surface 8*a* or the first diffraction grating 4 and the second diffraction grating 6 so as to be parallel to each other.

Four steps are used as the scanning steps of the first diffraction grating 4, but it is known that the initial phase can be detected as long as the number of scanning steps is three or more.

The piezoelectric stage 5 is employed as the shifting unit of the first diffraction grating 4, but a slight shift stage employing a servomotor with high accuracy or a pulse motor with reduced cogging may be used as the shift unit.

Figure 1C:
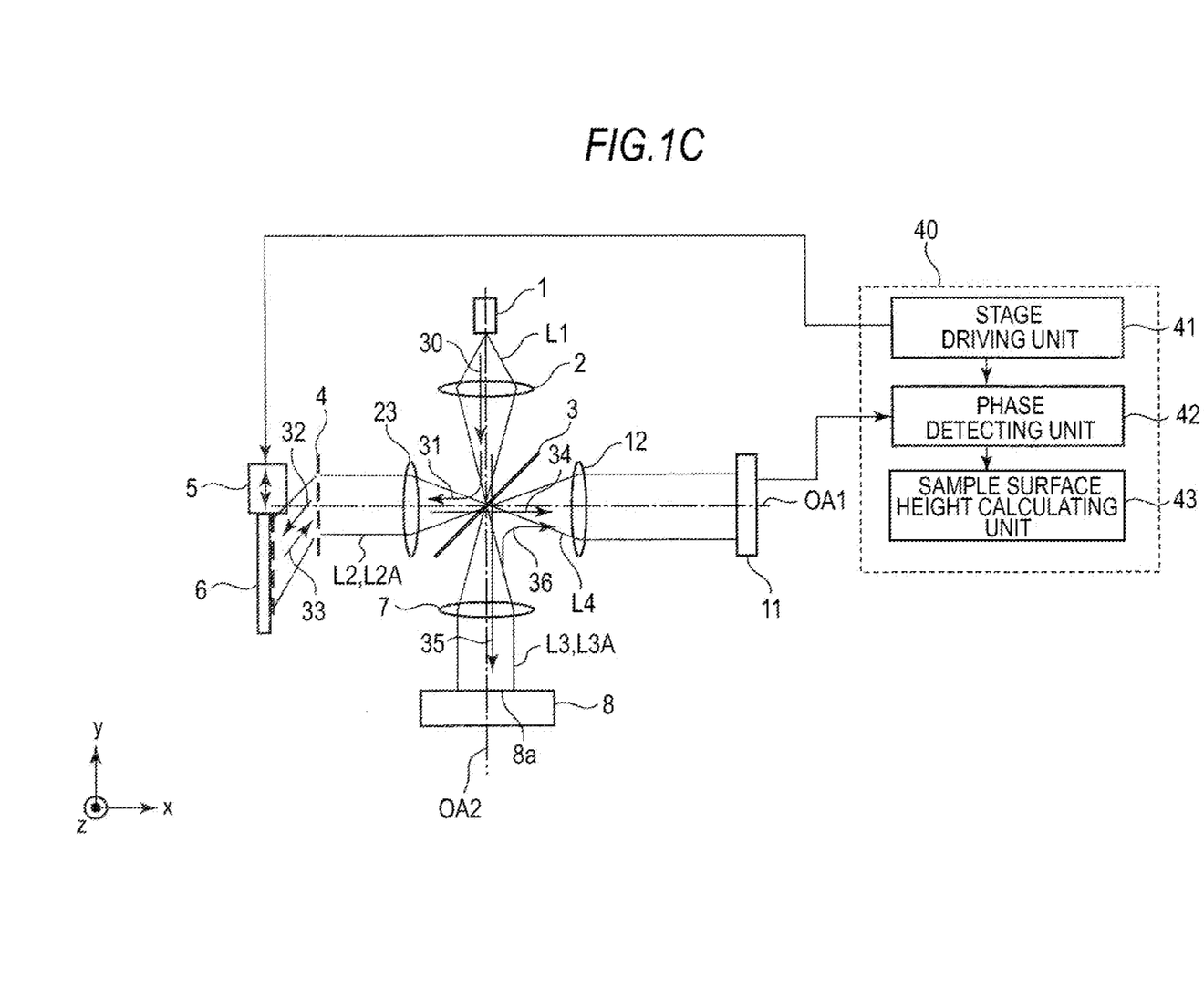
FIG. 1C is a diagram schematically illustrating a surface profile measuring apparatus according to a modification example of the first embodiment.
Figure 10:
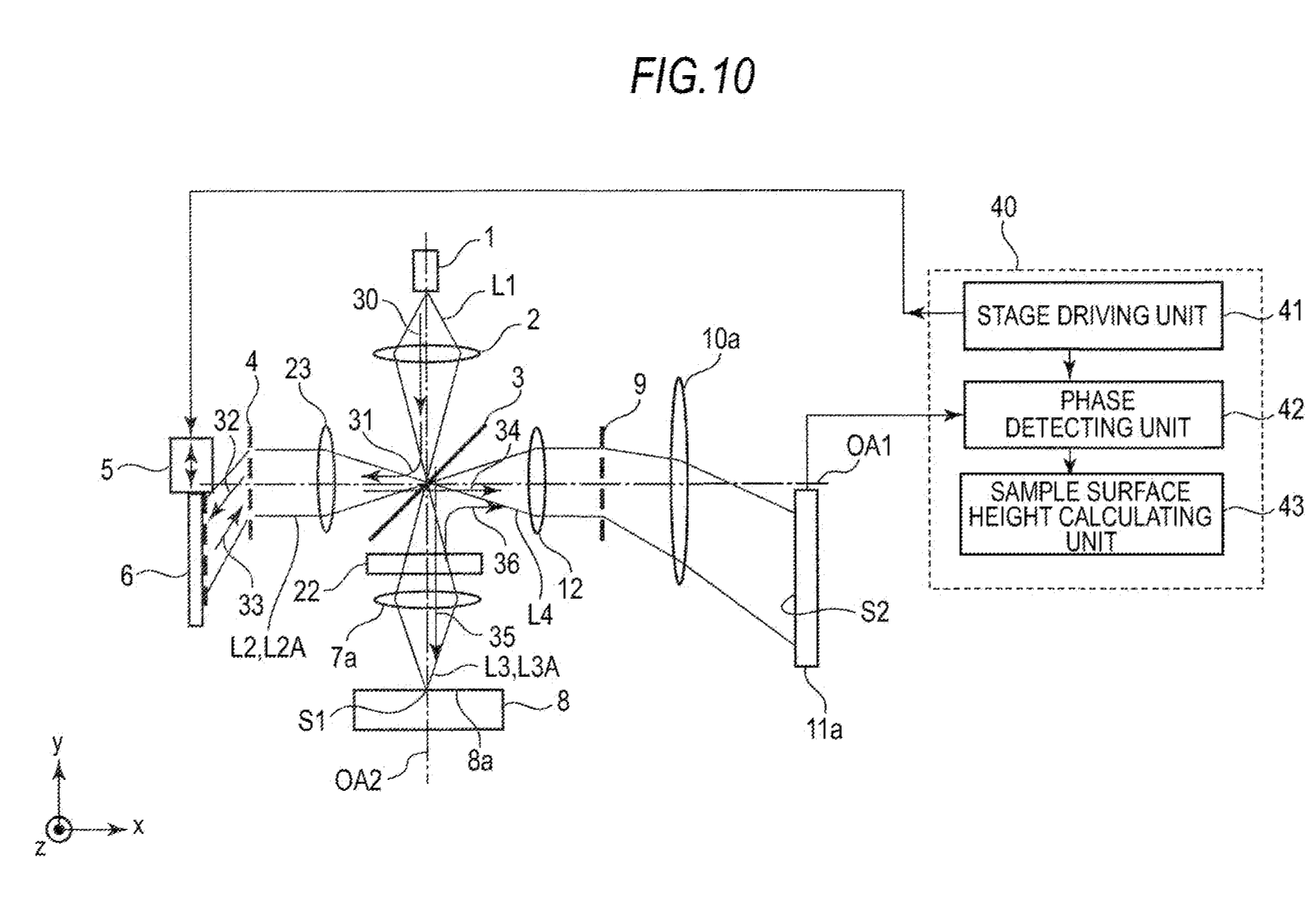
FIG. 10 is a diagram schematically illustrating a surface profile measuring apparatus according to a modification example of the second embodiment.

In the first and second embodiments, in order to modulate a phase, the first diffraction grating 4 is slightly shifted by the use of the piezoelectric stage 5 and the second diffraction grating 6 is fixed. However, since the phase modulation is possible through the use of the relative shift between the diffraction gratings, the following modification examples can be employed. In a modification example, as shown in FIGS. 1C and 10, the first diffraction grating 4 may be fixed and the second diffraction grating 6 may be slightly shifted through the use of the piezoelectric stage 5 as an example of the shifting unit in response to an instruction from the stage driving unit 41.

Figure 11:
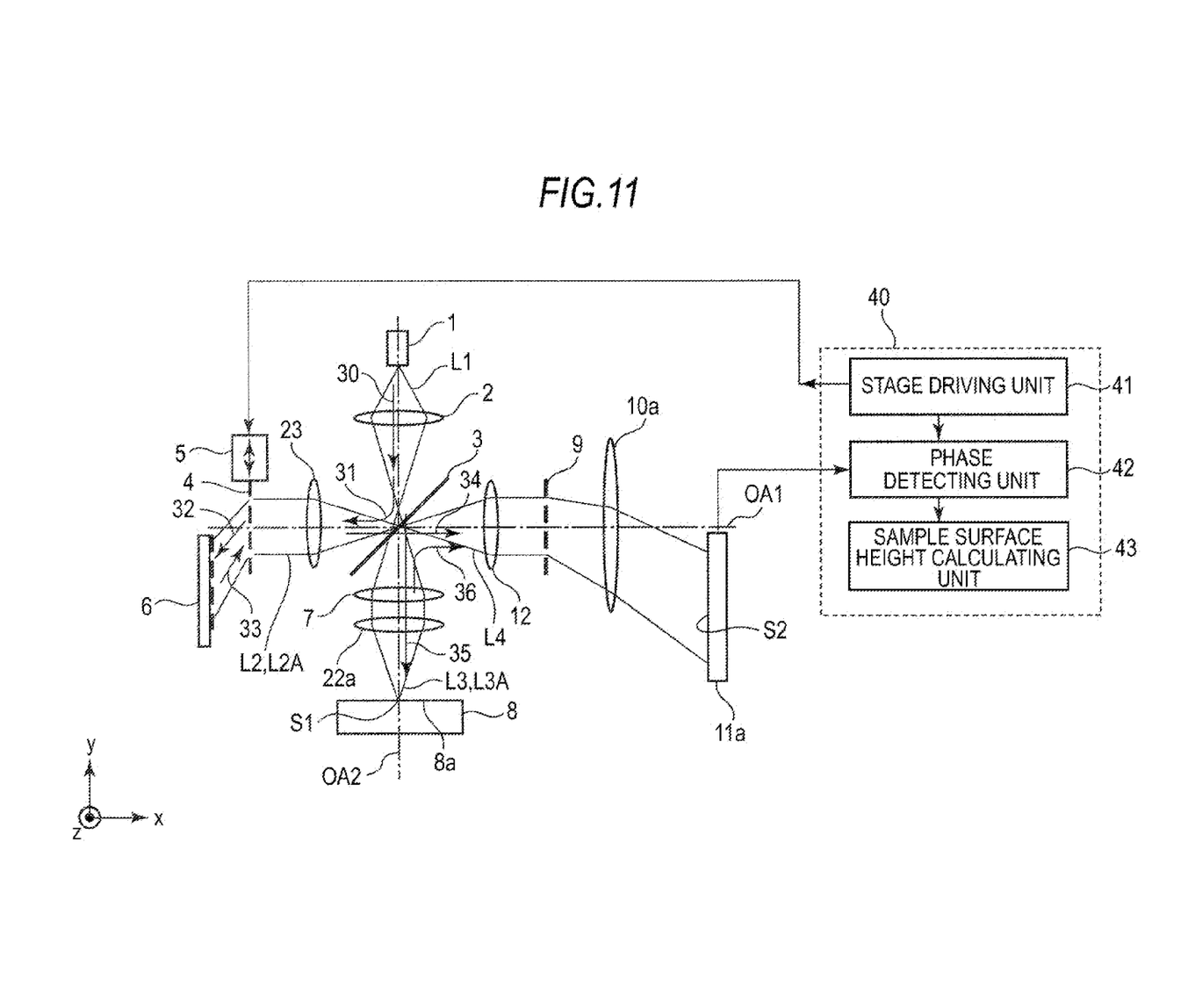
FIG. 11 is a diagram schematically illustrating a surface profile measuring apparatus according to another modification example of the second embodiment.

In the second embodiment, as shown in FIG. 8, the focus spot of a linear shape parallel to the z axis is formed on the sample surface 8*a* by the use of the lens 7*a* and the cylindrical lens 22 as an example of the first cylindrical lens. Instead, as shown in FIG. 11, a cylindrical lens 22*a* as another example of the first cylindrical lens and the lens 7 shown in FIG. 1A may be employed. The cylindrical lens 22*a* shown in FIG. 11 has a cylinder axis parallel to the z axis direction. In the xy plane, the cylindrical lens 22*a* has a lens function and a parallel beam from the lens 7 is focused on the sample surface 8*a* through the use of the cylindrical lens 22*a*. On the other hand, in the yz plane, the cylindrical lens 22*a* does not have a lens function and the parallel beam from the lens 7 is applied onto the sample surface 8*a* without any change. In this way, a focus spot of a linear shape parallel to the z axis can be formed on the sample surface 8*a* by the use of the cylindrical lens 22*a* and the lens 7.

The cylindrical lens 10*a* shown in FIG. 8 is not particularly limited as long as it is an optical member capable of forming a focus spot of a linear shape on the CCD 11*a*. The optical members have to be configured so that the length direction (the first direction) of the spot of a linear shape (the first focus spot S1 shown in FIG. 8) on the sample surface 8*a*, the length direction (the first direction) of the grating grooves of the third diffraction grating 9, and the length direction (the first direction) of the spot of a linear shape (the second focus spot S2 shown in FIG. 8) on the CCD 11*a* are parallel to each other.

By appropriately combining some embodiments or modification examples out of various embodiments or modification examples described above, it is possible to achieve the advantages of the respective embodiments or examples.

What is claimed is:

1. A surface profile measuring apparatus comprising:
    a light source operable to emit a light beam having a plurality of wavelengths;
    a splitter unit operable to split the light beam into a reference beam and a measuring beam;
    a first diffraction grating operable to diffract the reference beam;
    a reflection unit operable to reflect the reference beam diffracted by the first diffraction grating and cause the reflected reference beam to be incident on the first diffraction grating again;

a detection unit operable to receive an interference beam in which the reference beam, which is incident again on the first diffraction grating and diffracted by the first diffraction grating, and the measuring beam, which is reflected by a sample surface, optically interfere with each other, and operable to detect an interference intensity signal for each wavelength in the interference beam;

a plurality of parallel grating grooves provided in a surface of the first diffraction grating;

a shifting unit operable to shift the first diffraction grating in a direction perpendicular to the plurality of parallel grating grooves in the first diffraction grating surface;

a calculation unit operable to calculate a phase of the interference intensity signal for each wavelength in the interference beam on a basis of the interference intensity signal for each wavelength varying with a degree of shift of the first diffraction grating caused by the shifting unit; and a measurement unit operable to measure the sample surface on a basis of the phase of the interference intensity signal for each wavelength.

2. A surface profile measuring apparatus comprising:

a light source operable to emit a light beam having a plurality of wavelengths;

a splitter unit operable to split the light beam into a reference beam and a measuring beam;

a first diffraction grating operable to diffract the reference beam;

a second diffraction grating operable to diffract the reference beam diffracted by the first diffraction grating and cause the diffracted reference beam to be incident on the first diffraction grating again;

a detection unit operable to receive an interference beam in which the reference beam, which is incident again on the first diffraction grating and diffracted again by the first diffraction grating, and the measuring beam, which is reflected by a sample surface, optically interfere with each other, and operable to detect an interference intensity signal for each wavelength in the interference beam;

a plurality of parallel grating grooves provided in a surface of the second diffraction grating;

a shifting unit operable to shift the second diffraction grating in a direction perpendicular to the plurality of parallel grating grooves in the second diffaction grating surface;

a calculation unit operable to calculate a phase of the interference intensity signal for each wavelength in the interference beam on a basis of the interference intensity signal for each wavelength varying with a degree of shift of the second diffraction grating caused by the shifting unit; and a measurement unit operable to measure the sample surface on a basis of the phase of the interference intensity signal for each wavelength.

3. The surface profile measuring apparatus according to claim 1, further comprising:

a first cylindrical lens operable to focus the measuring beam to form a first focus spot of a linear shape parallel to a first direction on the sample surface;

a third diffraction grating located in an optical path of the interference beam and having grating grooves parallel to the first direction; and a second cylindrical lens operable to focus the interference beam diffracted by the third diffraction grating to form a second focus spot of a linear shape parallel to the first direction on the detection unit.

4. The surface profile measuring apparatus according to claim 3, wherein the first direction is a longitudinal direction of the first focus spot.

5. A surface profile measuring method comprising:

emitting a light beam having a plurality of wavelengths;

splitting the light beam into a reference beam to enter a first diffraction grating and a measuring beam to enter a sample surface, wherein a plurality of parallel grating grooves are provided in a surface of the first diffraction grating;

reflecting the reference beam diffracted by the first diffraction grating and causing the reflected reference beam to be diffracted again by the first diffraction grating;

detecting an interference intensity signal for each wavelength in an interference beam through the use of a detection unit by receiving the interference beam in which the reference beam diffracted again by the first diffraction grating and the measuring beam reflected by the sample surface optically interfere with each other;

shifting the first diffraction grating in a direction perpendicular to the plurality of parallel grating grooves in the first diffraction grating surface;

calculating a phase of the interference intensity signal for each wavelength in the interference beam on a basis of the interference intensity signal for each wavelength varying with a degree of shift of the first diffraction grating performed by the shifting; and measuring the sample surface on a basis of the phase of the interference intensity signal for each wavelength.

6. The surface profile measuring method according to claim 5, wherein the measuring beam is focused on a first focus spot of a linear shape parallel to a first direction and is incident on the sample surface, and wherein the interference beam is diffracted by a third diffraction grating having grating grooves parallel to the first direction, is focused on a second focus spot of a linear shape parallel to the first direction, and is then incident on the detection unit.

7. The surface profile measuring method according to claim 6, wherein the first direction is a longitudinal direction of the first focus spot.

8. The surface profile measuring apparatus according to claim 2, further comprising:

a first cylindrical lens operable to focus the measuring beam to form a first focus spot of a linear shape parallel to a first direction on the sample surface;

a third diffraction grating located in an optical path of the interference beam and having grating grooves parallel to the first direction; and a second cylindrical lens operable to focus the interference beam diffracted by the third diffraction grating to form a second focus spot of a linear shape parallel to the first direction on the detection unit.

9. The surface profile measuring apparatus according to claim 1, further comprising:

a thickness correcting plate disposed either between the beam splitter and the sample surface or between the beam splitter and the first diffraction grating;

wherein the thickness correcting plate has a same thickness as the beam splitter.

10. The surface profile measuring apparatus according to claim 2, further comprising:

a thickness correcting plate disposed either between the beam splitter and the sample surface or between the beam splitter and the first diffraction grating;

wherein the thickness correcting plate has a same thickness as the beam splitter.

* * * * *